(12) United States Patent
Lopatka et al.

(10) Patent No.: US 10,789,941 B2
(45) Date of Patent: Sep. 29, 2020

(54) ACOUSTIC EVENT DETECTOR WITH REDUCED RESOURCE CONSUMPTION

(71) Applicant: INTEL CORPORATION, Santa Clara, CA (US)

(72) Inventors: Kuba Lopatka, Gdansk (PL); Mateusz Kotarski, Sopot (PL); Tobias Bocklet, Kronach (DE); Marek Zabkiewicz, Gdynia (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/146,416

(22) Filed: Sep. 28, 2018

(65) Prior Publication Data

US 2019/0043489 A1 Feb. 7, 2019

(51) Int. Cl.
*G10L 15/16* (2006.01)
*G10L 15/22* (2006.01)
(Continued)

(52) U.S. Cl.
CPC ............. *G10L 15/16* (2013.01); *G06F 9/542* (2013.01); *G06F 17/147* (2013.01);
(Continued)

(58) Field of Classification Search
CPC ......... G10L 15/16; G10L 15/02; G10L 15/22; G10L 25/51; G06F 9/542; G06F 17/147;
(Continued)

(56) References Cited

U.S. PATENT DOCUMENTS

2011/0264447 A1* 10/2011 Visser ................. G10L 25/78
704/208
2014/0278391 A1* 9/2014 Braho ................. G10L 25/78
704/233
(Continued)

OTHER PUBLICATIONS

Megha et al., "Robust Classification of Abnormal Audio using Background-Foreground Separation," 2017 14th IEEE India Council International Conference (INDICON), Roorkee, 2017, pp. 1-6. (Year: 2017).*

(Continued)

*Primary Examiner* — Michelle M Koeth
(74) *Attorney, Agent, or Firm* — Finch & Maloney PLLC

(57) ABSTRACT

Techniques are provided for efficient acoustic event detection with reduced resource consumption. A methodology implementing the techniques according to an embodiment includes calculating frames of power spectra based on segments of received acoustic signals. The method further includes two processes, one for detecting impulsive acoustic events and another for detecting continuous acoustic events. The first process includes generating impulsive acoustic event features associated with first and second power spectrum frames, applying a neural network classifier to the impulsive acoustic event features to generate event scores, and detecting an impulsive acoustic event based on those event scores. The second process includes generating reduced-dimension continuous acoustic event features associated with the first and second power spectrum frames, applying a neural network classifier to the reduced-dimension continuous acoustic event features to generate a second set of event scores, and detecting a continuous acoustic event based on the second set of event scores.

17 Claims, 10 Drawing Sheets
(3 of 10 Drawing Sheet(s) Filed in Color)

(51) Int. Cl.
   *G10L 15/02* (2006.01)
   *G06N 3/04* (2006.01)
   *G06F 17/14* (2006.01)
   *G06K 9/00* (2006.01)
   *G06K 9/62* (2006.01)
   *G10L 25/51* (2013.01)
   *G06N 3/08* (2006.01)
   *G06F 9/54* (2006.01)
   *G06K 9/46* (2006.01)

(52) U.S. Cl.
   CPC ....... *G06K 9/00536* (2013.01); *G06K 9/4628* (2013.01); *G06K 9/627* (2013.01); *G06N 3/04* (2013.01); *G06N 3/0454* (2013.01); *G06N 3/08* (2013.01); *G10L 15/02* (2013.01); *G10L 15/22* (2013.01); *G10L 25/51* (2013.01)

(58) Field of Classification Search
   CPC .......... G06N 3/04; G06N 3/0454; G06N 3/08; G06K 9/00536; G06K 9/4628; G06K 9/627
   See application file for complete search history.

(56) References Cited

U.S. PATENT DOCUMENTS

| | | | | |
|---|---|---|---|---|
| 2015/0161995 | A1* | 6/2015 | Sainath | G10L 15/16 704/232 |
| 2016/0314803 | A1* | 10/2016 | Stone | G10L 25/48 |
| 2017/0148444 | A1 | 5/2017 | Bocklet et al. | |
| 2019/0074028 | A1* | 3/2019 | Howard | G10L 25/27 |

OTHER PUBLICATIONS

Wikipedia contributors, "Probabilistic classification," Wikipedia, The Free Encyclopedia, https://en.wikipedia.org/w/index.php?title=Probabilistic_classification&oldid=917869051 (accessed Oct. 1, 2019). (Year: 2019).*

McLoughlin et al., "Continuous robust sound event classification using time-frequency features and deep learning," PLoS One, Sep. 11, 2017, https://doi.org/10.1371/journal.pone.0182309 (accessed Oct. 1, 2019). (Year: 2017).*

Guo et al., "Environmental sound recognition using time-frequency intersection patterns," 2011 3rd International Conference on Awareness Science and Technology (iCAST), Dalian, 2011, pp. 243-246 (Year: 2011).*

Wang et al., "Audio-based multimedia event detection using deep recurrent neural networks," 2016 IEEE International Conference on Acoustics, Speech and Signal Processing (ICASSP), Shanghai, 2016, pp. 2742-2746 (Year: 2016).*

Sharma et al., "A technique for dimension reduction of MFCC spectral features for speech recognition," 2015 International Conference on Industrial Instrumentation and Control (ICIC), Pune, 2015, pp. 99-104 (Year: 2015).*

Khayam, "The Discrete Cosine Transform (DCT): Theory and Application," Michigan State University, Mar. 2003 (Year: 2003).*

Dufaux et al., "Automatic Detection and Classification of Wideband Acoustic Signals," University of Neuchatel, Jan. 1999. (Year: 1999).*

Oguzhan Gencoglu, Tuomas Virtanen, Heikki Huttunen, "Recognition of acoustic events using deep neural networks", 22nd European Signal Processing Conference, 2014, 5 pages.

Naoya Takahashi, Michael Gygli, Beat Pfister, Luc Van Gool, "Deep Convolutional Neural Networks and Data Augmentation for Acoustic Event Detection", INTERSPEECH 2016, 5 pages.

Y. Wang, L. Neves and F. Metze, "Audio-based multimedia event detection using deep recurrent neural networks," 2016 IEEE International Conference on Acoustics, Speech and Signal Processing (ICASSP), Shanghai, 2016, pp. 2742-2746.

Ryan Price, Ken-ichi Iso and Koichi Shinoda, "Wise teachers train better DNN acoustic models", EURASIP Journal on Audio, Speech, and Music Processing, 10, 2016, 19 pages.

* cited by examiner

ACOUSTIC EVENT DETECTOR WITH REDUCED RESOURCE CONSUMPTION

BACKGROUND

Acoustic event detection is becoming increasingly important with the development of Internet of Things (IoT), smart home systems, and digital surveillance systems. Event detection and recognition systems are employed to automatically detect acoustic events of interest, for example to trigger a desired action based on the event. As such, these systems typically need to be in an always-listening state to maximize utility, and should therefore ideally consume minimal computational, memory, and power resources. These systems, however, often need the capability to detect a broad range of types of acoustic events, and this generally requires significant resource consumption.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts.

Figure 1:
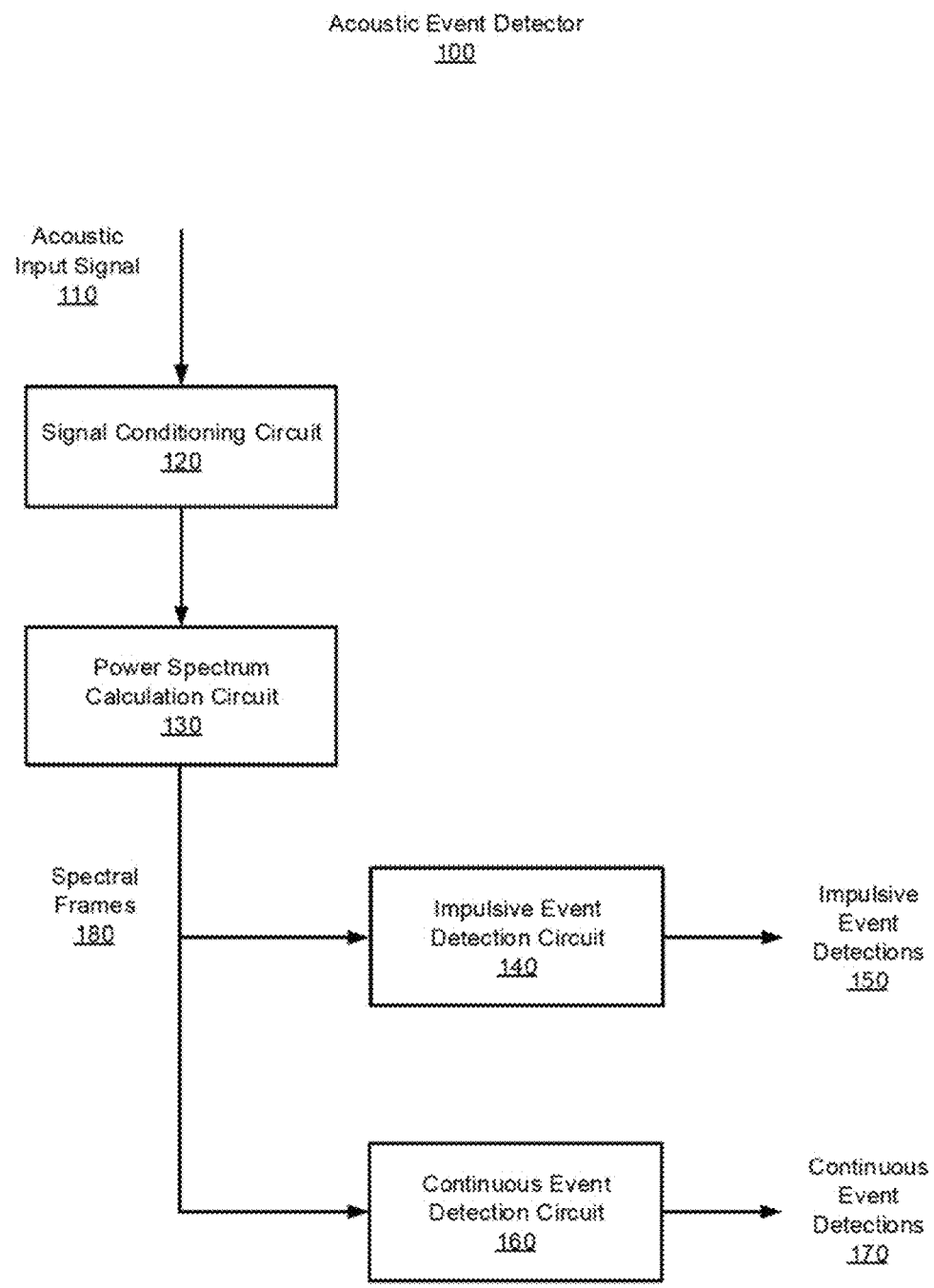
FIG. 1 is a top-level block diagram of an acoustic event detector, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided for efficient acoustic event detection through the use of dual processing paths, one for impulsive acoustic events and another for continuous acoustic events, resulting in improved accuracy with reduced resource consumption (e.g., computation, memory, and power consumption). This is particularly beneficial for devices and applications that typically need to be in an always-listening or always-on state. The disclosed techniques for processing of acoustic events, divided into two general categories—impulsive and continuous, avoid the need for a separate feature-specific acoustic model for each event type of interest, and further avoid the resulting linear growth in complexity which accompanies an increase in the number of detectable event types, according to some embodiments. Likewise, the disclosed division of events into two categories also avoids the alternative use of a single, and therefore more complex, acoustic model that can detect all of the event types of interest, such as a convolutional neural network (CNN) operating on very large feature sets, according to some embodiments. In an embodiment, the disclosed techniques may serve as a front end processing system for Internet of Things (IoT) devices, smart home systems, digital surveillance systems, and the like, which are configured to take actions based on any number of types of detected acoustic events, such as, for example, a baby cry, a ringing phone, or a wake-up phrase (continuous), or a glass break or gunshot (impulsive). Other applications will be apparent.

Thus, this disclosure provides techniques for efficient acoustic event detection suitable for implementation on devices with limited computational, memory, and power resources. The disclosed techniques can be implemented, for example, in a computing system or a software product executable or otherwise controllable by such systems, although other embodiments will be apparent. The system or product is configured to perform acoustic event detection using dual processes, one configured for detecting impulsive acoustic events, and another configured for detecting continuous acoustic events. In accordance with an embodiment, a methodology to implement these techniques includes calculating frames of power spectra based on segments of a received acoustic signal. The first detection process includes generating impulsive acoustic event features associated with each of the power spectrum frames, applying a neural network classifier to the impulsive acoustic event features to generate event scores, and detecting an impulsive acoustic event based on analysis of those event scores, as will be described in greater detail below. The second detection process includes generating reduced-dimension continuous acoustic event features associated with each of the power spectrum frames, applying a neural network classifier to the reduced-dimension continuous acoustic event features to generate a second set of event scores, and detecting a continuous acoustic event based on analysis of the second set of event scores, as will also be described in greater detail below.

It will be appreciated that the techniques described herein may allow for improved acoustic event detection by providing dual processing paths for impulsive and continuous events, which enables the use of relatively less complex acoustic models operating on feature vectors of reduced size. This is particularly beneficial for devices and applications that need to be in an always-listening state and which are hosted on platforms with limited resources, such as, for example, embedded processors and digital signal processing (DSP) circuits. The disclosed techniques can be implemented on a broad range of platforms including IoT systems, smart home control systems, robotic systems, laptops, tablets, smart phones, workstations, and low-power embedded DSP/CPU systems or devices. These techniques may further be implemented in hardware or software or a combination thereof.

FIG. 1 is a top-level block diagram of an acoustic event detector 100, configured in accordance with certain embodiments of the present disclosure. The detector 100 is shown to include a signal conditioning circuit 120, a power spectrum calculation circuit 130, an impulsive event detection circuit 140, and a continuous event detection circuit 160.

The optional signal conditioning circuit 120 is configured to perform any desired pre-processing operations on the received acoustic input signal 110, such as, for example, gain adjustments, removal of DC bias, and/or pre-emphasis (e.g., high-pass filtration). These adjustments prepare the signal for subsequent operations in the acoustic event detector and may improve the performance of the detector.

The power spectrum calculation circuit 130 is configured to calculate power spectral frames 180 based on time segments of the received acoustic time-domain signal, using a short-term Fourier transform (STFT), banks of filters (e.g., Finite Impulse Response—FIR filters), or other known techniques in light of the present disclosure. The use of FIR filters, for example, may provide additional power savings compared to more computationally expensive Fourier transforms.

The impulsive event detection circuit 140 is configured to generate impulsive event detections 150 based on the provided spectral frames 180 of the input signal 110. Examples of impulsive acoustic events include, but are not limited to, gunshots, glass break, door knock, dog bark, and other such similar sounds which are associated with sudden perturbations of the acoustic field, and have a typical duration in the range of 1 second or less.

The continuous event detection circuit 160 is configured to generate continuous event detections 170 based on the provided spectral frames 180 of the input signal 110. Examples of continuous acoustic events include, but are not limited to, screams, crying babies, a ringing telephone, alarms, and other such similar sounds which typically have a harmonic structure and can last for a longer period of time, for example a few seconds or more.

Operations of the impulsive event detection circuit 140 and the continuous event detection circuit 160 will be described in greater detail below, but at a high level, most sounds of interest can be effectively categorized into one of these two groups, impulsive and continuous, which are each described by different types of acoustic features and are thus amenable to different approaches with respect to signal analysis. Separate acoustic feature frontend processors and feature classifiers are employed for each category. The outputs of the classifiers are then provided to backend processors which are configured to generate event detections by smoothing and thresholding of the classifier outputs.

Figure 2:
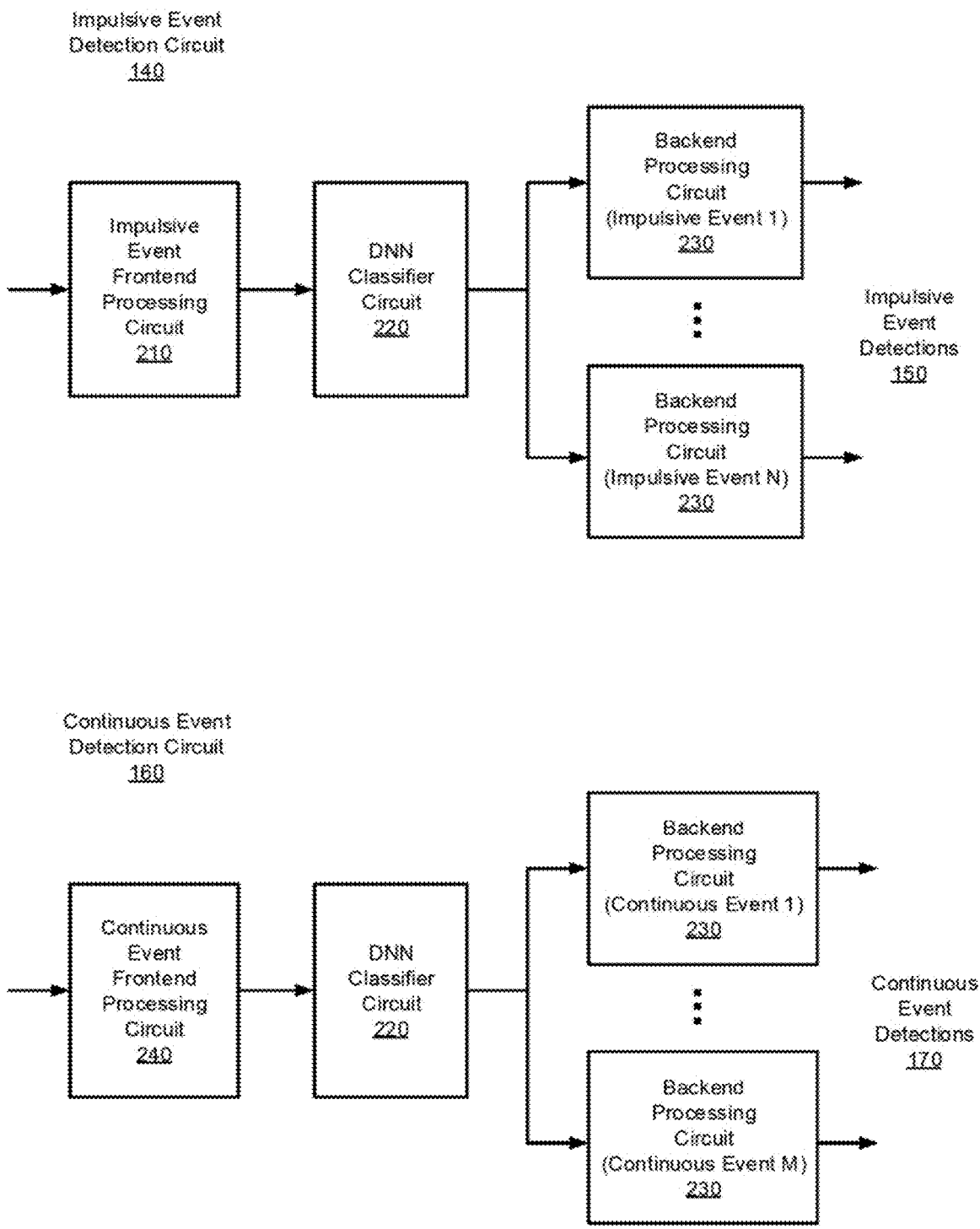
FIG. 2 is a block diagram of an impulsive event detection circuit and a continuous event detection circuit, configured in accordance with certain embodiments of the present disclosure.

FIG. 2 is a block diagram of an impulsive event detection circuit 140 and a continuous event detection circuit 160, configured in accordance with certain embodiments of the present disclosure. The impulsive event detection circuit 140 is shown to include an impulsive event frontend processing circuit 210, a deep neural network (DNN) classifier circuit 220, and a number (N) of backend processing circuits 230, for example one for each detected impulsive acoustic event. The continuous event detection circuit 160 is shown to include a continuous event frontend processing circuit 240, another deep neural network (DNN) classifier circuit 220, and a number (M) of the backend processing circuits 230, for example one for each detected continuous acoustic event.

The impulsive event frontend processing circuit 210 is configured to generate impulsive acoustic event features, associated with each of the power spectrum frames, to be provided to the deep neural network (DNN) classifier circuit 220. The DNN classifier circuit 220 is configured to generate a set of event scores for impulsive events based on the impulsive acoustic event features. The backend processing circuits 230 are configured to each generate an impulsive acoustic event detection 150 based on the set of impulsive event scores. The operations of each of these circuits will be explained in greater detail below.

The continuous event frontend processing circuit 240 is configured to generate reduced-dimension continuous acoustic event features, associated with each of the power spectrum frames, to be provided to another deep neural network (DNN) classifier circuit 220. Because continuous acoustic events tend to have longer durations, the number of acoustic features can grow to be very large, and so feature vector dimensionality reduction is employed to allow for an efficient classifier which can be run on a platform with limited resources. The DNN classifier circuit 220 is configured to generate a set of event scores for continuous events based on the reduced-dimension continuous acoustic event features. The backend processing circuits 230 are configured to each generate a continuous acoustic event detection 170 based on the set of continuous event scores. The operations of each of these circuits will be explained in greater detail below.

Figure 3:
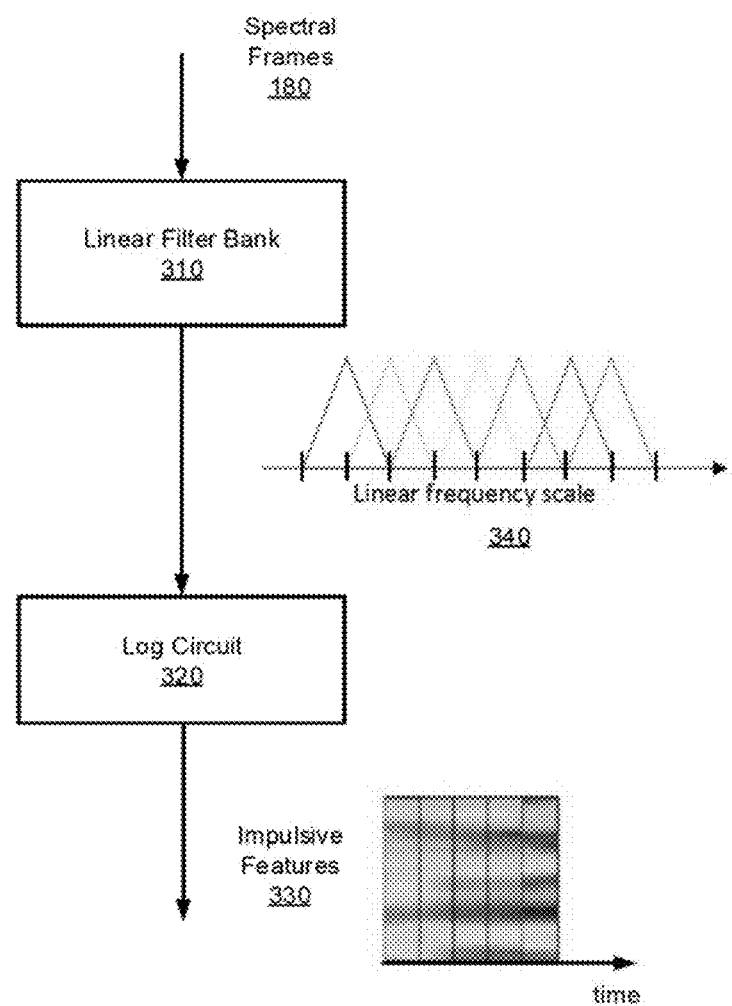
FIG. 3 is a block diagram of an impulsive event frontend processing circuit, configured in accordance with certain embodiments of the present disclosure.

FIG. 3 is a block diagram of an impulsive event frontend processing circuit 210, configured in accordance with certain embodiments of the present disclosure. The impulsive event frontend processing circuit 210 is shown to include a linear filter bank 310 and a logarithm circuit 320. The linear filter bank 310 is configured to distribute the power spectrum over linearly spaced frequency bins as illustrated, for example, by the linear frequency scale 340. In some embodiments, the linear filter bank 310 may employ FIR filters directly on the time-domain single, thus bypassing the Fourier transform power spectrum calculation, providing additional power saving.

The logarithm circuit 320 is configured to calculate the logarithm of the values in the linearly spaced frequency bins to generate the impulsive acoustic event features 330. These features 330, also referred to as a feature vector, describe the distinctive properties, including transient features, that can be used by the subsequent classifier to distinguish between impulsive events and other sounds. In some embodiments, to constrain the size of the resulting feature vector, the frame rate of the spectral frames 180 may be limited to 20 frames per second or less.

Figure 4:
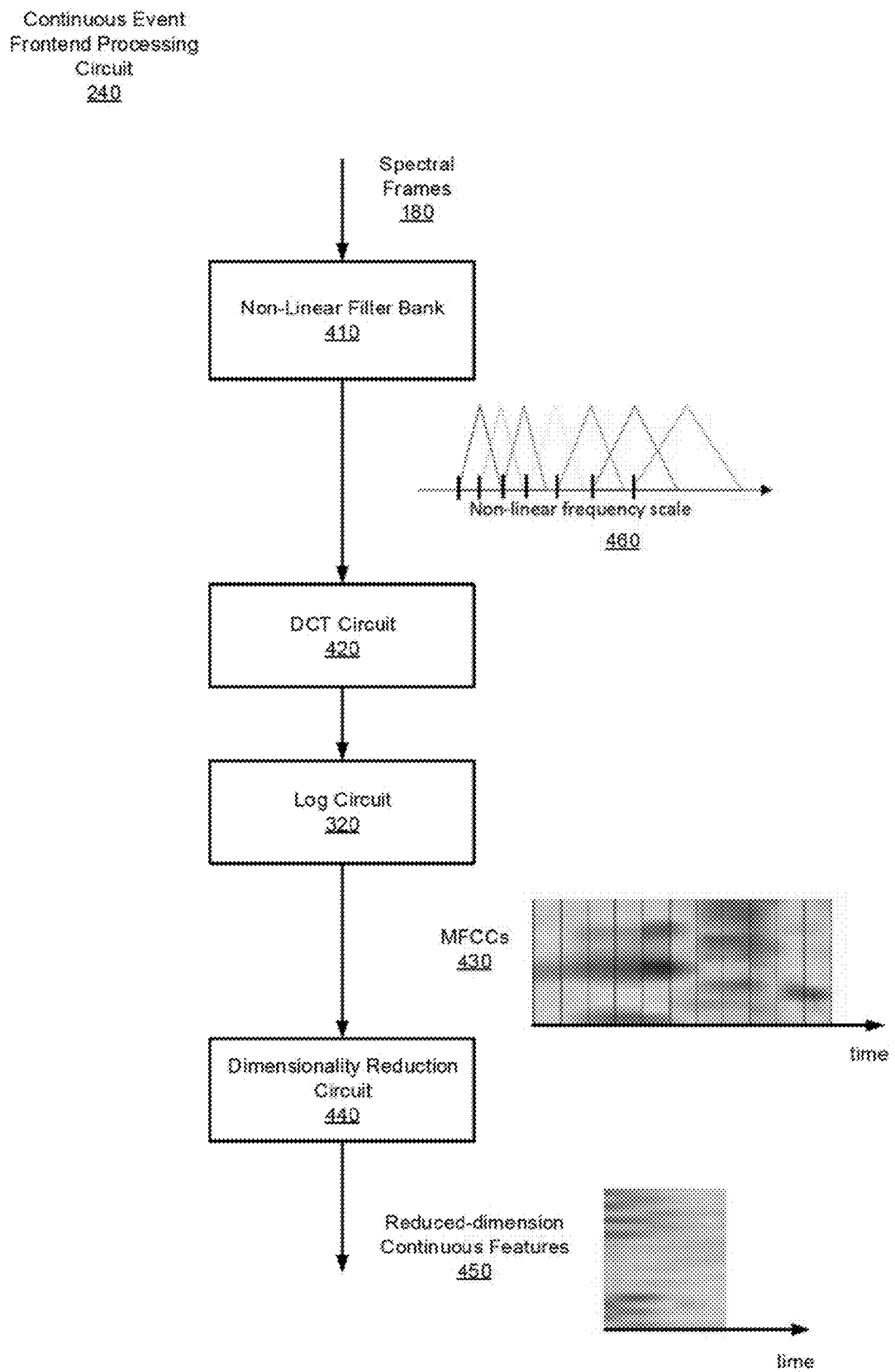
FIG. 4 is a block diagram of a continuous event frontend processing circuit, configured in accordance with certain embodiments of the present disclosure.

FIG. 4 is a block diagram of a continuous event frontend processing circuit 240, configured in accordance with certain embodiments of the present disclosure. The continuous event frontend processing circuit 240 is shown to include a non-linear filter bank 410, a discrete cosine transform (DCT) circuit 420, the logarithm circuit 320, and a dimensionality reduction circuit 440.

The non-linear filter bank 410 is configured to distribute the power spectrum over non-linearly spaced frequency bins as illustrated, for example, by the non-linear frequency scale 460. In some embodiments, the non-linearly spaced frequency bins may conform to Mel frequency scaling, Bark frequency scaling, or other known types of frequency scaling in light of the present disclosure. In some embodiments, any other type of frequency scaling, including linear frequency scaling may be employed. In some embodiments, the non-linear filter bank 410 may employ FIR filters directly on the time-domain single, thus bypassing the Fourier transform power spectrum calculation, providing additional power saving.

The discrete cosine transform (DCT) circuit 420 is configured to perform a DCT on the frequency bins (whether non-linearly spaced, or otherwise), and the logarithm circuit 320 is configured to calculate the logarithm of the DCT transformed bins to generate Mel-Frequency Cepstral Coefficients (MFCCs) 430 which represent the features of the continuous acoustic event. These MFCCs may be stored or stacked in a history buffer (not shown) for subsequent processing by the dimensionality reduction circuit 440.

To adequately describe the continuous acoustic events, feature vectors generally need to be calculated and buffered over a larger time span, compared to impulsive acoustic events. In some cases, for example, buffering on the order of 0.75 seconds may be appropriate. For an input signal framerate of 100 Hz, this would result in 75 frames. If all of the features were used by the classifier, the input layer of the DNN would require more than 1000 nodes, making the model too large and expensive to run on a platform with limited resources. The dimensionality reduction circuit 440 is configured to reduce the dimensionality of the stacked MFCCs 430 to generate the reduced-dimension continuous acoustic event features 450. According to an embodiment, an efficient method to reduce the dimensionality employs linear projection:

$$X \cdot P = \tilde{X}$$

where X is a K×M feature matrix comprising M feature vectors (the stacked MFCCs 430 associated with M time steps or frames), each storing K features. P is an M×N projection matrix comprising M base vectors of N coefficients each (where N<M to reduce or compress the time dimension from M to N), and $\tilde{X}$ is the reduced dimension feature matrix comprising feature vectors of length K at N compressed time steps. The projection operation is illustrated by the following matrix multiplication:

$$\begin{bmatrix} -x_1- \\ -x_2- \\ \cdots \\ -x_K- \end{bmatrix}_{K \times M} \cdot \begin{bmatrix} | & | & & | \\ p_1 & p_2 & \cdots & p_N \\ | & | & & | \end{bmatrix}_{M \times N} = \begin{bmatrix} -\tilde{x}_1- \\ -\tilde{x}_2- \\ \cdots \\ -\tilde{x}_K- \end{bmatrix}_{K \times M}$$

Application of another DCT, for the dimensionality reduction projection matrix, is found to be particularly efficient. Thus, in some embodiments, the base vectors of the projection matrix are cosine kernel functions:

$$P(m, n) = \cos\left[\frac{\pi}{M}\left(n + \frac{1}{2}\right)m\right]$$

Thus, for example, If M=75 and K=23, the feature matrix X before dimensionality reduction has 1725 elements. By retaining only N=8 DCT coefficients (i.e., calculating P for m=1 to 75 and for n=1 to 8), the compressed feature matrix $\tilde{X}$ is reduced to only 184 elements, which allows for a smaller and more efficient DNN implementation.

In some embodiments, the dimensionality reduction may be accomplished by applying Principal Component Analysis, Linear Discriminant Analysis, Nonnegative Matrix Factorization, or other known techniques, in light of the present disclosure, to the stacked MFCCs 430.

Figure 5:
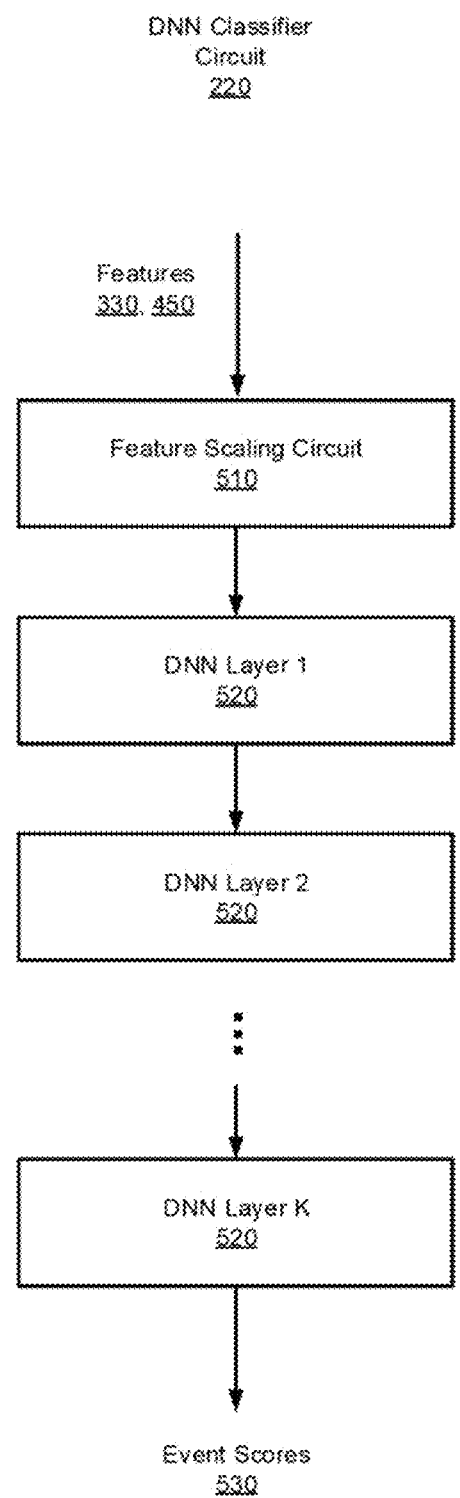
FIG. 5 is a block diagram of a deep neural network classifier circuit, configured in accordance with certain embodiments of the present disclosure.

FIG. 5 is a block diagram of a deep neural network classifier circuit 220, configured in accordance with certain embodiments of the present disclosure. The DNN classifier circuit 220 is shown to include a feature scaling circuit 510 and a number (K) of DNN layers 520. The classifier operates on the impulsive features 330, or the continuous features 450, depending on the branch of the event detector, to generate event scores 530 which indicate the probability that an audio frame belongs to a given event class with an associated label. A variety of event classes are possible including classes that represent target events, such as a glass break or baby cry, or non-target events which include uninteresting background sounds.

The feature scaling circuit 510 is configured to normalize the features, 330, 450, to zero mean and unit variance, prior to processing by the DNN layers 520.

In some embodiments, the DNN classifier circuit 220 is configured as a deep feedforward neural network comprising a number of fully connected affine layers 520. In some embodiments, the number of layers may be in the range of 4 to 6 layers. Each layer 520 may include approximately 128 perceptrons. In some embodiments, the operation of each layer can be described by the equation y=ƒ(w x+b), where the layer inputs x are multiplied by layer weights w, shifted by a bias factor b, and operated on by an activation function ƒ which may be implemented as a sigmoid function, a hyperbolic tangent function, or a rectified linear function. The network topology may be represented by the parameters w and b for each layer, and may be updated as needed to handle different acoustic events.

Figure 6:
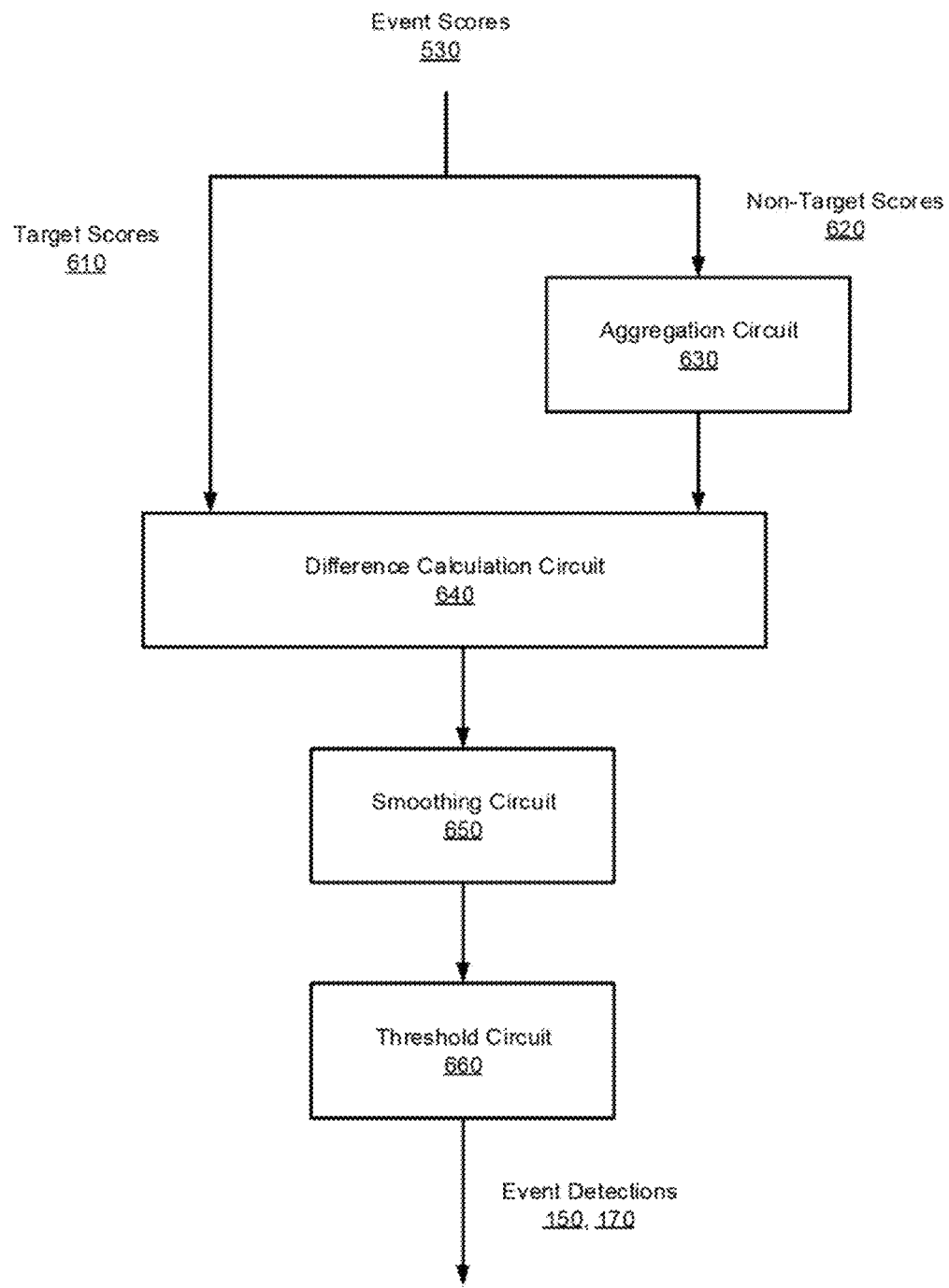
FIG. 6 is a block diagram of a backend processing circuit, configured in accordance with certain embodiments of the present disclosure.

FIG. 6 is a block diagram of a backend processing circuit 230a, configured in accordance with certain embodiments of the present disclosure. The backend processing circuit 230a is shown to include a score aggregation circuit 630, a difference calculation circuit 640, a smoothing circuit 650, and a threshold circuit 660. One backend processing circuit 230a may be employed for each of the N possible impulsive event detections 150 and for each of the M possible continuous event detections 170. The backend processing circuits 230a, which are of low computational complexity, essentially smooth the DNN classifier outputs and determine at which point an event is detected based on a threshold comparison.

Figure 7:
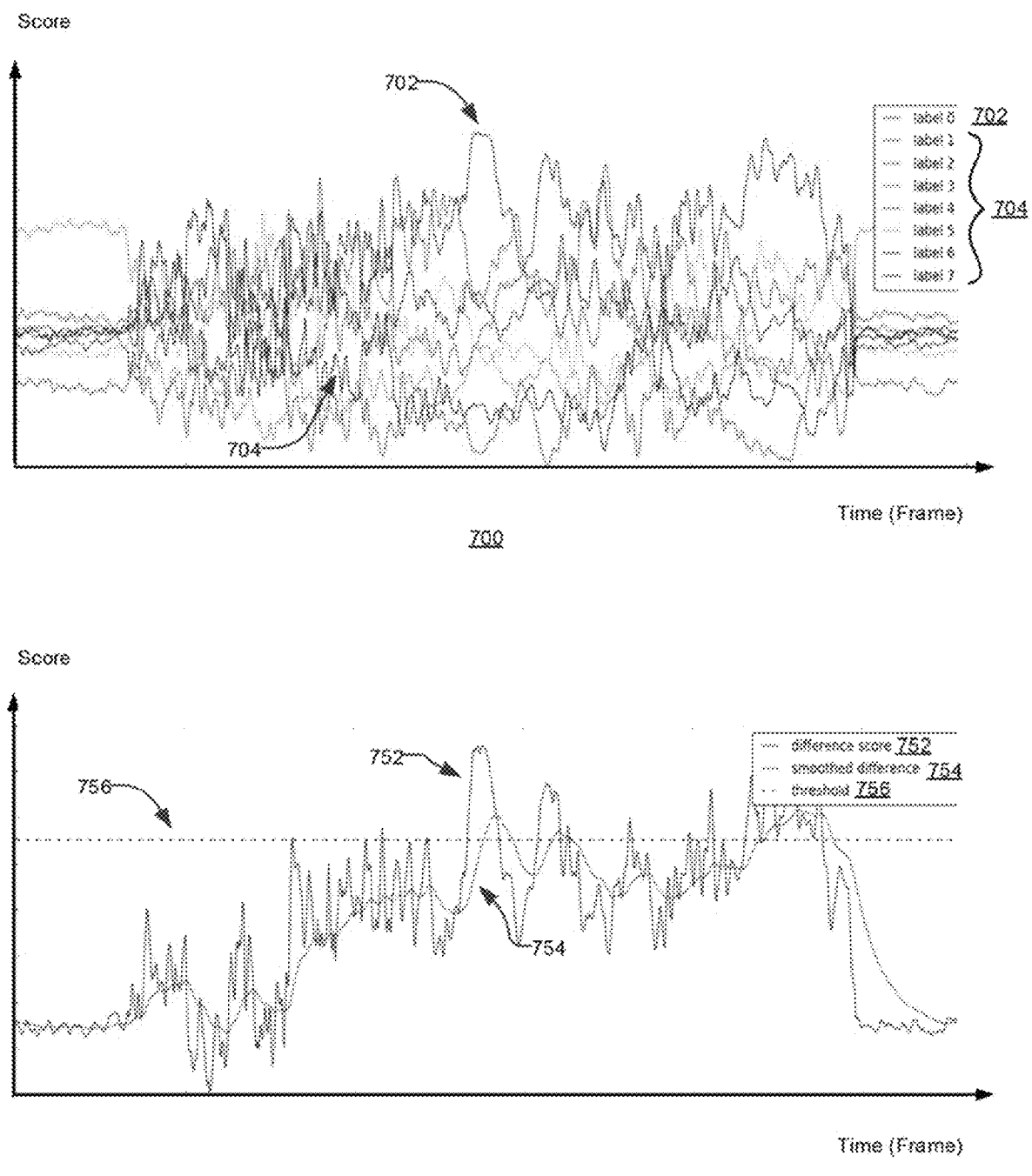
FIG. 7 illustrates plots of raw scores and processed scores, in accordance with certain embodiments of the present disclosure.

An example of DNN classifier outputs are illustrated in the plot 700 of FIG. 7 which shows raw output scores versus time (frame) for each of 8 labeled events. Label 0 (702) is a target event score, while labels 1-7 (704) are non-target event scores. The score aggregation circuit 630 is configured to aggregate non-target event scores, labels 1-7. In some embodiments, the aggregated score value may be computed as a maximum, a mean, or a weighted mean of the non-target event scores. Other aggregation calculations are possible.

The difference calculation circuit 640 is configured to calculate the difference between target event score (label 0) and the aggregation of the non-target event scores (labels 1-7). This difference score is illustrated as 752 in plot 750.

The smoothing circuit 650 is configured to smooth the calculated difference 752. This smoothed difference score is illustrated as 754 in plot 750. In some embodiments, the smoothing operation may be described by the following equation:

smooth score($i$)=(1−α)·(difference score)+α·smooth score($i$−1)

where 0<α<1 is an exponential smoothing constant. The purpose of the exponential smoothing is to disregard short-term, primarily random, variability of the output scores. By setting α to a value closer to 1 (e.g. α=0.999) the backend processing circuit can be tuned to react to longer events.

Also shown, is a threshold marker 756. The threshold circuit 660 is configured to generate an event detection, 150, 170, when the smoothed difference 754 exceeds the selected threshold 756.

Figure 8:
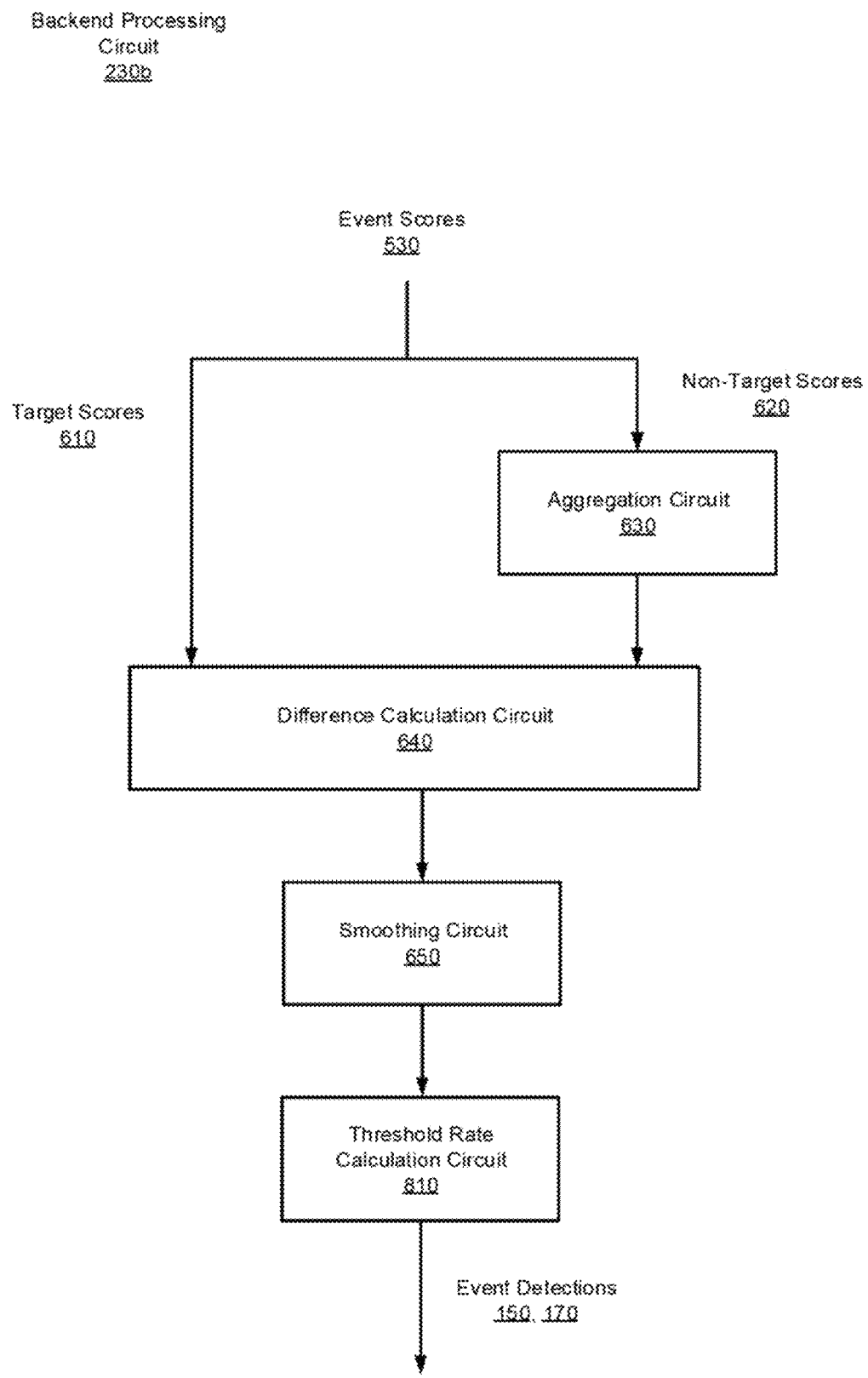
FIG. 8 is a block diagram of another backend processing circuit, configured in accordance with certain embodiments of the present disclosure

FIG. 8 is a block diagram of another backend processing circuit 230*b*, configured in accordance with certain other embodiments of the present disclosure. The backend processing circuit 230*b* is shown to include the score aggregation circuit 630, the difference calculation circuit 640, the smoothing circuit 650, and a threshold rate calculation circuit 810. Backend processing circuit 230*b* operates in a similar manner to that of backend processing circuit 230*a*, as described previously, except that the output of the smoothing circuit 650 is provided to the threshold rate calculation circuit 810. The threshold rate calculation circuit 810 is configured to determine the number of times that the smoothed score exceeds the threshold in a fixed time window (e.g., 1 second) and to generate an event detection, 150, 170, if the number exceeds a rate threshold, for example 10 times in a 1 second window.

Methodology

Figure 9:
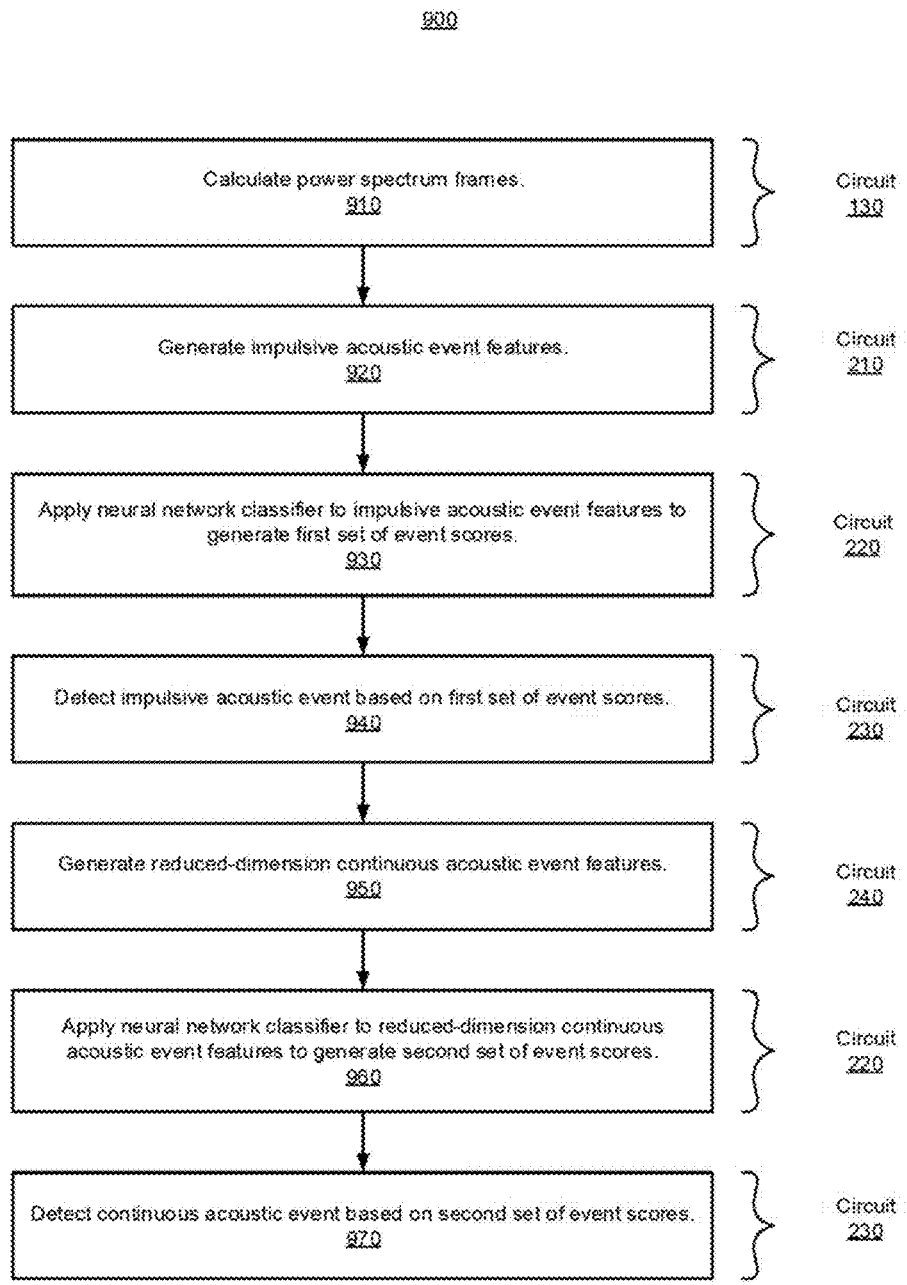
FIG. 9 is a flowchart illustrating a methodology for acoustic event detection, in accordance with certain embodiments of the present disclosure.

FIG. 9 is a flowchart illustrating an example method 900 for acoustic event detection with improved efficiency and reduced resource consumption, in accordance with certain embodiments of the present disclosure. As can be seen, the example method includes a number of phases and sub-processes, the sequence of which may vary from one embodiment to another. However, when considered in the aggregate, these phases and sub-processes form a process for acoustic event detection, in accordance with certain of the embodiments disclosed herein. These embodiments can be implemented, for example, using the system architecture illustrated in FIGS. 1-6, and 8, as described above. However other system architectures can be used in other embodiments, as will be apparent in light of this disclosure. To this end, the correlation of the various functions shown in FIG. 9 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 900. Thus, other embodiments may have fewer or more modules and/or sub-modules depending on the granularity of implementation. In still other embodiments, the methodology depicted can be implemented as a computer program product including one or more non-transitory machine-readable mediums that when executed by one or more processors cause the methodology to be carried out. Numerous variations and alternative configurations will be apparent in light of this disclosure.

As illustrated in FIG. 9, in an embodiment, method 900 for acoustic event detection commences by calculating, at operation 910, power spectrum frames based on a received acoustic signal. In some embodiments, the power spectrum calculating operation may be optional, in which case FIR filters may be applied directly to the time-domain signal to generate linear and non-linear frequency spaced data for subsequent operations.

Next, at operation 920, impulsive acoustic event features, associated with each of the power spectrum frames, are generated. In some embodiments, the impulsive acoustic event features are generated by applying a linear filter bank to the power spectrum frames to distribute the power spectrum over linearly spaced frequency bins, and calculating a logarithm of the linearly spaced frequency bins.

At operation 930, a first neural network classifier is applied to the impulsive acoustic event features to generate a first set of event scores. At operation 940, an impulsive acoustic event is detected based on the first set of event scores.

At operation 950, reduced-dimension continuous acoustic event features, associated with each of the power spectrum frames, are generated. In some embodiments, the reduced-dimension continuous acoustic event features are generated by applying a non-linear filter bank to the power spectrum frames to distribute the power spectrum over non-linearly spaced frequency bins, performing a Discrete Cosine Transform (DCT) on the non-linearly spaced frequency bins, calculating a logarithm of the DCT transformed bins to generate Mel-Frequency Cepstral Coefficients (MFCCs), and performing dimensionality reduction on the MFCCs to generate the reduced-dimension continuous acoustic event features. In some embodiments, the dimensionality reduction may be accomplished with a DCT based projection operator, as previously described.

At operation 960, a second neural network classifier is applied to the reduced-dimension continuous acoustic event features to generate a second set of event scores. At operation 970, a continuous acoustic event is detected based on the second set of event scores.

Of course, in some embodiments, additional operations may be performed, as previously described in connection with the system. For example, a difference may be calculated between an event score associated with a target event and an aggregation of the scores from among all of the non-target events. The acoustic event detection may be decided if the difference exceeds a threshold value. In some embodiments, the neural network classifiers are deep feedforward neural networks comprising between four and six fully connected affine layers.

Example System

Figure 10:
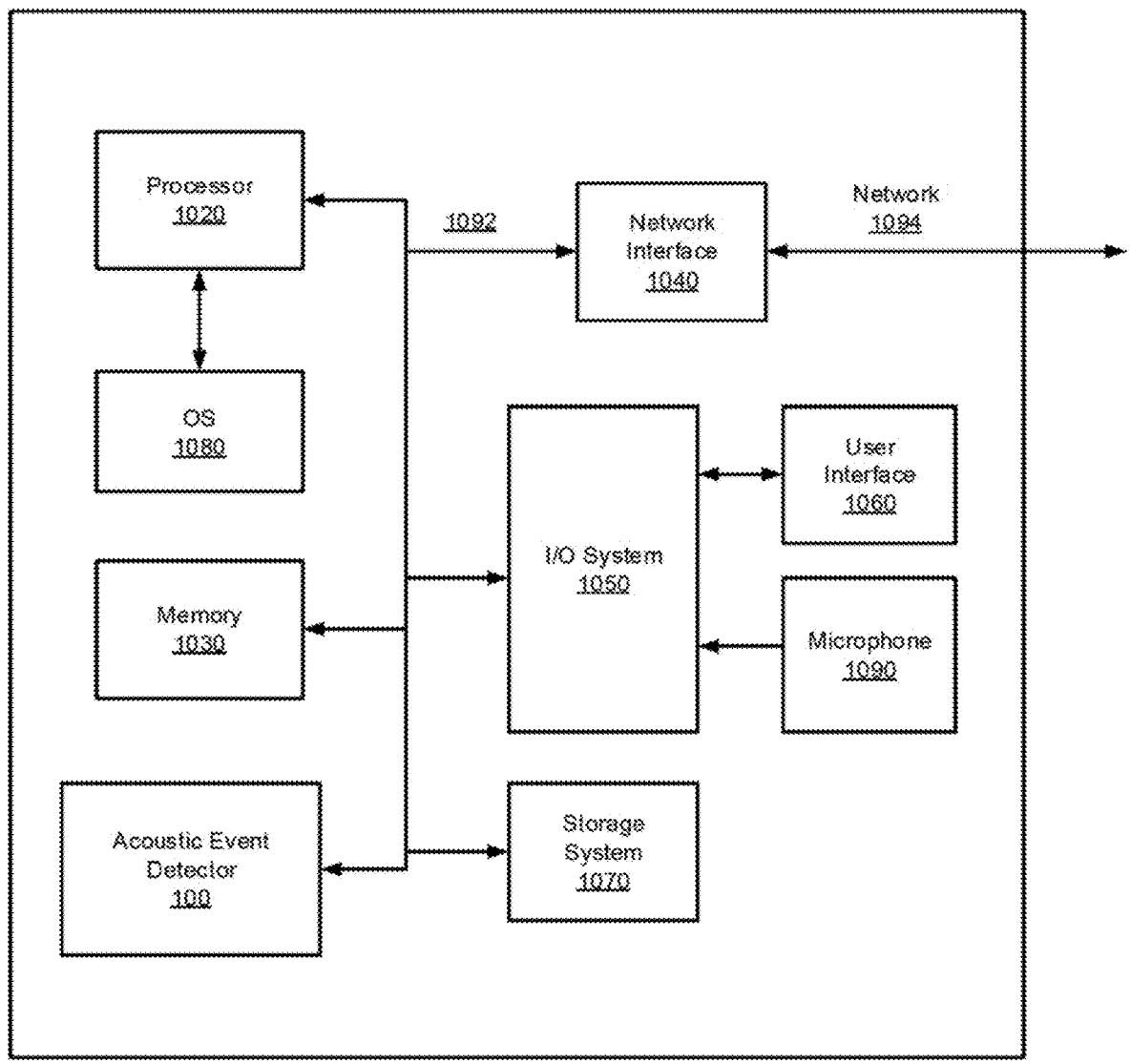
FIG. 10 is a block diagram schematically illustrating a platform configured to perform acoustic event detection, in accordance with certain embodiments of the present disclosure.

FIG. 10 illustrates an example platform 1000, configured in accordance with certain embodiments of the present disclosure, to perform acoustic event detection with improved efficiency and reduced resource consumption. In some embodiments, platform 1000 may be hosted on, or otherwise be incorporated into a personal computer, workstation, server system, smart home management system, IoT device, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, wearable device, embedded system, and so forth. Any combination of different devices may be used in certain embodiments.

In some embodiments, platform 1000 may comprise any combination of a processor 1020, a memory 1030, acoustic event detector 100, a network interface 1040, an input/output (I/O) system 1050, a user interface 1060, a microphone or microphone array 1090, and a storage system 1070. As can be further seen, a bus and/or interconnect 1092 is also provided to allow for communication between the various components listed above and/or other components not shown. Platform 1000 can be coupled to a network 1094 through network interface 1040 to allow for communications with other computing devices, platforms, devices to be controlled, or other resources. Other componentry and functionality not reflected in the block diagram of FIG. 10 will be apparent in light of this disclosure, and it will be appreciated that other embodiments are not limited to any particular hardware configuration.

Processor 1020 can be any suitable processor, and may include one or more coprocessors or controllers, such as an audio processor, a graphics processing unit, or hardware accelerator, to assist in control and processing operations associated with platform 1000. In some embodiments, the processor 1020 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1020 may be implemented as a complex instruction set computer (CISC) or a reduced instruction set computer (RISC) processor. In some embodiments, processor 1020 may be configured as an x86 instruction set compatible processor.

Memory 1030 can be implemented using any suitable type of digital storage including, for example, flash memory and/or random-access memory (RAM). In some embodiments, the memory 1030 may include various layers of memory hierarchy and/or memory caches as are known to those of skill in the art. Memory 1030 may be implemented as a volatile memory device such as, but not limited to, a RAM, dynamic RAM (DRAM), or static RAM (SRAM) device. Storage system 1070 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1070 may comprise technology to increase the storage performance enhanced protection for valuable digital media when multiple hard drives are included.

Processor 1020 may be configured to execute an Operating System (OS) 1080 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 1000, and therefore may also be implemented using any suitable existing or subsequently-developed platform.

Network interface circuit 1040 can be any appropriate network chip or chipset which allows for wired and/or wireless connection between other components of device platform 1000 and/or network 1094, thereby enabling platform 1000 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1050 may be configured to interface between various I/O devices and other components of device platform 1000. I/O devices may include, but not be limited to, user interface 1060 and microphone(s) 1090. User interface 1060 may include devices (not shown) such as a speaker, display element, touchpad, keyboard, and mouse, etc. I/O system 1050 may include a graphics subsystem configured to perform processing of images for rendering on the display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1020 or any chipset of platform 1000.

It will be appreciated that in some embodiments, the various components of platform 1000 may be combined or integrated in a system-on-a-chip (SoC) architecture. In some embodiments, the components may be hardware components, firmware components, software components or any suitable combination of hardware, firmware or software.

Acoustic event detector 100 is configured to provide efficient acoustic event detection with reduced resource consumption, using dual processes for impulsive acoustic events and continuous acoustic events, as described previously. Acoustic event detector 100 may include any or all of the circuits/components illustrated in FIGS. 1-6 and 8, as described above. These components can be implemented or otherwise used in conjunction with a variety of suitable software and/or hardware that is coupled to or that otherwise forms a part of platform 1000. These components can additionally or alternatively be implemented or otherwise used in conjunction with user I/O devices that are capable of providing information to, and receiving information and commands from, a user.

In some embodiments, these circuits may be installed local to platform 1000, as shown in the example embodiment of FIG. 10. Alternatively, platform 1000 can be implemented in a client-server arrangement wherein at least some functionality associated with these circuits is provided to platform 1000 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 1094 or remotely coupled to network 1094 by one or more other networks and/or communication channels. In some cases, access to resources on a given network or computing system may require credentials such as usernames, passwords, and/or compliance with any other suitable security mechanism.

In various embodiments, platform 1000 may be implemented as a wireless system, a wired system, or a combination of both. When implemented as a wireless system, platform 1000 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 1000 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the acoustic event detection methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 1094. In other embodiments, the functionalities disclosed herein can be incorporated into other voice-enabled devices and speech-based software applications, such as, for example, smart-home management, entertainment, robotic applications, and IoT device applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 1000 may comprise additional, fewer, or alternative subcomponents as compared to those included in the example embodiment of FIG. 10.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a processor-implemented method for acoustic event detection, the method comprising: generating, by a processor-based system, impulsive acoustic event features associated with frames of an acoustic signal; applying, by the processor-based system, a first neural network classifier to the impulsive acoustic event features to generate a first set of event scores; detecting, by the processor-based system, an impulsive acoustic event based on the first set of event scores; generating, by the processor-based system, reduced-dimension continuous acoustic event features associated with the frames of the acoustic signal; applying, by the processor-based system, a second neural network classifier to the reduced-dimension continuous acoustic event features to generate a second set of event scores; and detecting, by the processor-based system, a continuous acoustic event based on the second set of event scores.

Example 2 includes the subject matter of Example 1, wherein the generating of the impulsive acoustic event features comprises: applying a linear filter bank to the frames of the acoustic signal to distribute the acoustic signal over linearly spaced frequency bins; and calculating a logarithm of the linearly spaced frequency bins to generate the impulsive acoustic event features.

Example 3 includes the subject matter of Examples 1 or 2, wherein the generating of the reduced-dimension continuous acoustic event features comprises: applying a non-linear filter bank to the frames of the acoustic signal to distribute the acoustic signal over non-linearly spaced frequency bins; performing a Discrete Cosine Transform (DCT) on the non-linearly spaced frequency bins; calculating a logarithm of the DCT transformed bins to generate Mel-Frequency Cepstral Coefficients (MFCCs); and performing dimensionality reduction on the MFCCs to generate the reduced-dimension continuous acoustic event features.

Example 4 includes the subject matter of any of Examples 1-3, wherein the non-linearly spaced frequency bins conform to Mel frequency scaling or Bark frequency scaling.

Example 5 includes the subject matter of any of Examples 1-4, wherein the dimensionality reduction comprises applying a DCT based projection operator to a stored history of the MFCCs.

Example 6 includes the subject matter of any of Examples 1-5, wherein the first neural network classifier and the second neural network classifier are deep feedforward neural networks comprising a number of fully connected affine layers, the number of layers in the range of 4 to 6 layers.

Example 7 includes the subject matter of any of Examples 1-6, wherein: the detecting of the impulsive acoustic event comprises calculating a difference between an event score associated with a target impulsive event from the first set of event scores and an aggregate score associated with non-target impulsive events from the first set of event scores, and detecting the impulsive acoustic event if the difference exceeds a first threshold value; and the detecting of the continuous acoustic event comprises calculating a difference between an event score associated with a target continuous event from the second set of event scores and an aggregate score associated with non-target continuous events from the second set of event scores, and detecting the continuous acoustic event if the difference exceeds a second threshold value.

Example 8 is a system for acoustic event detection, the system comprising: an impulsive event frontend processing circuit to generate impulsive acoustic event features associated with frames of an acoustic signal; a first neural network classifier circuit to generate a first set of event scores based on the impulsive acoustic event features; a first backend processing circuit to detect an impulsive acoustic event based on the first set of event scores; a continuous event frontend processing circuit to generate reduced-dimension continuous acoustic event features associated with frames of the acoustic signal; a second neural network classifier circuit to generate a second set of event scores based on the reduced-dimension continuous acoustic event features; and a second backend processing circuit to detect a continuous acoustic event based on the second set of event scores.

Example 9 includes the subject matter of Example 8, wherein the impulsive event frontend processing circuit comprises: a linear filter bank to distribute the acoustic signal over linearly spaced frequency bins; and a logarithm circuit to calculate the logarithm of the linearly spaced frequency bins to generate the impulsive acoustic event features.

Example 10 includes the subject matter of Examples 8 or 9, wherein the continuous event frontend processing circuit comprises: a non-linear filter to distribute the acoustic signal over non-linearly spaced frequency bins; a Discrete Cosine Transform (DCT) circuit to perform a DCT on the non-linearly spaced frequency bins; a logarithm circuit to calculate the logarithm of the DCT transformed bins to generate Mel-Frequency Cepstral Coefficients (MFCCs); and a dimensionality reduction circuit to reduce the dimensionality of the MFCCs to generate the reduced-dimension continuous acoustic event features.

Example 11 includes the subject matter of any of Examples 8-10, wherein the dimensionality reduction comprises applying a DCT based projection operator to a stored history of the MFCCs.

Example 12 includes the subject matter of any of Examples 8-11, wherein the first neural network classifier circuit and the second neural network classifier circuit are deep feedforward neural networks comprising a number of fully connected affine layers, the number of layers in the range of 4 to 6 layers.

Example 13 includes the subject matter of any of Examples 8-12, wherein: the first backend processing circuit is to detect the impulsive acoustic event by calculating a difference between an event score associated with a target impulsive event from the first set of event scores and an aggregate score associated with non-target impulsive events from the first set of event scores, and detecting the impulsive acoustic event if the difference exceeds a first threshold value; and the second backend processing circuit is to detect the continuous acoustic event by calculating a difference between an event score associated with a target continuous event from the second set of event scores and an aggregate score associated with non-target continuous events from the second set of event scores, and detecting the continuous acoustic event if the difference exceeds a second threshold value.

Example 14 is at least one non-transitory computer readable storage medium having instructions encoded thereon that, when executed by one or more processors, cause a process to be carried out for acoustic event detection, the process comprising: generating impulsive acoustic event features associated with frames of an acoustic signal; applying a first neural network classifier to the impulsive acoustic event features to generate a first set of event scores; detecting an impulsive acoustic event based on the first set of event scores; generating reduced-dimension continuous acoustic event features associated with frames of the acoustic signal; applying a second neural network classifier to the reduced-dimension continuous acoustic event features to generate a second set of event scores; and detecting a continuous acoustic event based on the second set of event scores.

Example 15 includes the subject matter of Example 14, wherein the generating of the impulsive acoustic event features comprises the operations of: applying a linear filter bank to the frames of the acoustic signal to distribute the acoustic signal over linearly spaced frequency bins; and calculating a logarithm of the linearly spaced frequency bins to generate the impulsive acoustic event features.

Example 16 includes the subject matter of Examples 14 or 15, wherein the generating of the reduced-dimension continuous acoustic event features comprises the operations of: applying a non-linear filter bank to the frames of the acoustic signal to distribute the acoustic signal over non-linearly spaced frequency bins; performing a Discrete Cosine Transform (DCT) on the non-linearly spaced frequency bins; calculating a logarithm of the DCT transformed bins to generate Mel-Frequency Cepstral Coefficients (MFCCs); and performing dimensionality reduction on the MFCCs to generate the reduced-dimension continuous acoustic event features.

Example 17 includes the subject matter of any of Examples 14-16, wherein the non-linearly spaced frequency bins conform to Mel frequency scaling or Bark frequency scaling.

Example 18 includes the subject matter of any of Examples 14-17, wherein the dimensionality reduction comprises applying a DCT based projection operator to a stored history of the MFCCs.

Example 19 includes the subject matter of any of Examples 14-18, wherein the first neural network classifier and the second neural network classifier are deep feedforward neural networks comprising a number of fully connected affine layers, the number of layers in the range of 4 to 6 layers.

Example 20 includes the subject matter of any of Examples 14-19, wherein: the detecting of the impulsive acoustic event comprises the operations of calculating a difference between an event score associated with a target impulsive event from the first set of event scores and an aggregate score associated with non-target impulsive events from the first set of event scores, and detecting the impulsive acoustic event if the difference exceeds a first threshold value; and the detecting of the continuous acoustic event comprises the operations of calculating a difference between an event score associated with a target continuous event from the second set of event scores and an aggregate score associated with non-target continuous events from the second set of event scores, and detecting the continuous acoustic event if the difference exceeds a second threshold value.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for acoustic event detection, the method comprising:
   generating, by a processor-based system, impulsive acoustic event features associated with frames of an acoustic signal;
   applying, by the processor-based system, a first neural network classifier to the impulsive acoustic event features to generate a first set of event scores, wherein a first event score of the first set of event scores provides an indication of a probability of an acoustic event being a first type of impulsive acoustic event, wherein a second event score of the first set of event scores provides an indication of a probability of the acoustic event being a second type of impulsive acoustic event;
   detecting, by the processor-based system, the impulsive acoustic event and a type of the impulsive acoustic event from a plurality of types of impulsive acoustic events, wherein the detecting of the impulsive acoustic event comprises
      calculating a first difference between an event score associated with a target impulsive event from the first set of event scores and an aggregate score associated with non-target impulsive events from the first set of event scores, and
      detecting the impulsive acoustic event based on the first difference;
   generating, by the processor-based system, reduced-dimension continuous acoustic event features associated with the frames of the acoustic signal;
   applying, by the processor-based system, a second neural network classifier to the reduced-dimension continuous acoustic event features to generate a second set of event scores, wherein a third event score of the second set of event scores provides an indication of a probability of the acoustic event being a first type of continuous acoustic event, and wherein a fourth event score of the second set of event scores provides an indication of a probability of the acoustic event being a second type of continuous acoustic event; and
   detecting, by the processor-based system, a continuous acoustic event, wherein the detecting of the continuous acoustic event comprises
      calculating a second difference between an event score associated with a target continuous event from the second set of event scores and an aggregate score associated with non-target continuous events from the second set of event scores, and
      detecting the continuous acoustic event based on the second difference.

2. The method of claim 1, wherein the generating of the impulsive acoustic event features comprises:
   applying a linear filter bank to the frames of the acoustic signal to distribute the acoustic signal over linearly spaced frequency bins; and
   calculating a logarithm of the linearly spaced frequency bins to generate the impulsive acoustic event features.

3. The method of claim 1, wherein the generating of the reduced-dimension continuous acoustic event features comprises:
   applying a non-linear filter bank to the frames of the acoustic signal to distribute the acoustic signal over non-linearly spaced frequency bins;
   performing a Discrete Cosine Transform (DCT) on the non-linearly spaced frequency bins;
   calculating a logarithm of the DCT transformed bins to generate Mel-Frequency Cepstral Coefficients (MFCCs); and
   performing dimensionality reduction on the MFCCs to generate the reduced-dimension continuous acoustic event features.

4. The method of claim 3, wherein the non-linearly spaced frequency bins conform to Mel frequency scaling or Bark frequency scaling.

5. The method of claim 3, wherein the dimensionality reduction comprises applying a DCT based projection operator to a stored history of the MFCCs.

6. The method of claim 1, wherein the first neural network classifier and the second neural network classifier are deep feedforward neural networks comprising a number of fully connected affine layers, the number of layers in the range of 4 to 6 layers.

7. A system for acoustic event detection, the system comprising:
   an impulsive event frontend processing circuit to generate impulsive acoustic event features associated with frames of an acoustic signal;
   a first neural network classifier circuit to generate a first set of event scores based on the impulsive acoustic event features, wherein a first event score of the first set of event scores provides an indication of a probability of an acoustic event being a first type of impulsive acoustic event, and wherein a second event score of the first set of event scores provides an indication of a probability of the acoustic event being a second type of impulsive acoustic event;
   a first plurality of backend processing circuits to receive the first set of event scores, at least one of the first plurality of backend processing circuits to detect the impulsive acoustic event by
      calculating a first difference between an event score associated with a target impulsive event from the first set of event scores and an aggregate score associated with non-target impulsive events from the first set of event scores, and
      detecting the impulsive acoustic event based on the first difference;
   a continuous event frontend processing circuit to generate reduced-dimension continuous acoustic event features associated with frames of the acoustic signal;
   a second neural network classifier circuit to generate a second set of event scores based on the reduced-dimension continuous acoustic event features, wherein a third event score of the second set of event scores provides an indication of a probability of the acoustic event being a first type of continuous acoustic event, and wherein a fourth event score of the second set of event scores provides an indication of a probability of the acoustic event being a second type of continuous acoustic event; and
   a second plurality of backend processing circuits to receive the second set of event scores, at least one of the second plurality of backend processing circuits to detect the continuous acoustic event by calculating a second difference between an event score associated with a target continuous event from the second set of event scores and an aggregate score associated with non-target continuous events from the second set of event scores, and detecting the continuous acoustic event based on the second difference.

8. The system of claim 7, wherein the impulsive event frontend processing circuit comprises:
a linear filter bank to distribute the acoustic signal over linearly spaced frequency bins; and
a logarithm circuit to calculate the logarithm of the linearly spaced frequency bins to generate the impulsive acoustic event features.

9. The system of claim 7, wherein the continuous event frontend processing circuit comprises:
a non-linear filter to distribute the acoustic signal over non-linearly spaced frequency bins;
a Discrete Cosine Transform (DCT) circuit to perform a DCT on the non-linearly spaced frequency bins;
a logarithm circuit to calculate the logarithm of the DCT transformed bins to generate Mel-Frequency Cepstral Coefficients (MFCCs); and
a dimensionality reduction circuit to reduce the dimensionality of the MFCCs to generate the reduced-dimension continuous acoustic event features,
wherein the dimensionality reduction comprises applying a DCT based projection operator to a stored history of the MFCCs.

10. The system of claim 7, wherein the first neural network classifier circuit and the second neural network classifier circuit are deep feedforward neural networks comprising a number of fully connected affine layers, the number of layers in the range of 4 to 6 layers.

11. At least one non-transitory computer readable storage medium having instructions encoded thereon that, when executed by one or more processors, cause a process to be carried out for acoustic event detection, the process comprising:
generating impulsive acoustic event features associated with frames of an acoustic signal associated with an acoustic event;
applying a first neural network classifier to the impulsive acoustic event features to generate a first set of event scores, wherein a first event score of the first set of event scores provides an indication of a probability of the acoustic event being a first type of impulsive acoustic event, wherein a second event score of the first set of event scores provides an indication of a probability of the acoustic event being a second type of impulsive acoustic event;
detecting an impulsive acoustic event and a type of the impulsive acoustic event, wherein the detecting of the impulsive acoustic event comprises
calculating a first difference between an event score associated with a target impulsive event from the first set of event scores and an aggregate score associated with non-target impulsive events from the first set of event scores, and
detecting the impulsive acoustic event based on the first difference;
generating reduced-dimension continuous acoustic event features associated with frames of the acoustic signal;
applying a second neural network classifier to the reduced-dimension continuous acoustic event features to generate a second set of event scores, wherein a third event score of the second set of event scores provides an indication of a probability of the acoustic event being a first type of continuous acoustic event, wherein a fourth event score of the second set of event scores provides an indication of a probability of the acoustic event being a second type of continuous acoustic event; and
detecting a continuous acoustic event, wherein the detecting of the continuous acoustic event comprises
calculating a second difference between an event score associated with a target continuous event from the second set of event scores and an aggregate score associated with non-target continuous events from the second set of event scores, and
detecting the continuous acoustic event based on the second difference.

12. The computer readable storage medium of claim 11, wherein the generating of the impulsive acoustic event features comprises the operations of:
applying a linear filter bank to the frames of the acoustic signal to distribute the acoustic signal over linearly spaced frequency bins; and
calculating a logarithm of the linearly spaced frequency bins to generate the impulsive acoustic event features.

13. The computer readable storage medium of claim 11, wherein the generating of the reduced-dimension continuous acoustic event features comprises the operations of:
applying a non-linear filter bank to the frames of the acoustic signal to distribute the acoustic signal over non-linearly spaced frequency bins;
performing a Discrete Cosine Transform (DCT) on the non-linearly spaced frequency bins;
calculating a logarithm of the DCT transformed bins to generate Mel-Frequency Cepstral Coefficients (MFCCs); and
performing dimensionality reduction on the MFCCs to generate the reduced-dimension continuous acoustic event features.

14. The computer readable storage medium of claim 13, wherein the dimensionality reduction comprises applying a DCT based projection operator to a stored history of the MFCCs.

15. The computer readable storage medium of claim 11, wherein the first neural network classifier and the second neural network classifier are deep feedforward neural networks comprising a number of fully connected affine layers, the number of layers in the range of 4 to 6 layers.

16. The system of claim 7, wherein:
each of the first plurality of backend processing circuits is to detect a corresponding type of impulsive acoustic event of a first plurality of impulsive acoustic events; and
each of the second plurality of backend processing circuits is to detect a corresponding type of continuous acoustic event of a second plurality of continuous acoustic events.

17. The method of claim 1, wherein the generating of the reduced-dimension continuous acoustic event features comprises:
performing dimensionality reduction to generate the reduced-dimension continuous acoustic event features, and
wherein the method comprises refraining from applying dimensionality reduction while generating the impulsive acoustic event features.

* * * * *